United States Patent [19]

Clapp et al.

[11] Patent Number: 5,296,021

[45] Date of Patent: Mar. 22, 1994

[54] AEROSOL-DISPENSABLE FOODSTUFFS PARTING COMPOSITION

[75] Inventors: Clarence P. Clapp; George S. Torrey, both of Danville, Ill.

[73] Assignee: Creative Products Inc. of Rossville, Rossville, Ill.

[21] Appl. No.: 967,511

[22] Filed: Oct. 28, 1992

[51] Int. Cl.$^5$ .................................................. A23D 9/00
[52] U.S. Cl. ......................................... 106/2; 106/267; 106/252; 106/263; 106/244; 426/811; 426/602; 426/609; 426/662
[58] Field of Search .............. 426/811, 602, 609, 662; 106/2, 267, 252, 263, 244

[56] References Cited

U.S. PATENT DOCUMENTS

| | | | |
|---|---|---|---|
| 3,231,391 | 1/1966 | Breivik et al. | 99/139 |
| 3,301,881 | 1/1967 | Davis | 260/403 |
| 3,896,975 | 7/1975 | Follmer | 106/244 |
| 4,073,411 | 2/1978 | Doumani | 106/244 |
| 4,188,412 | 2/1980 | Sejpal | 426/609 |
| 4,325,980 | 4/1982 | Rek et al. | 426/604 |
| 4,371,451 | 2/1983 | Scotti et al. | 426/811 |
| 4,425,164 | 1/1984 | Bliznak et al. | 106/150 |
| 4,479,977 | 10/1984 | Dashiell et al. | 426/609 |
| 4,524,085 | 6/1985 | Purves et al. | 426/601 |
| 4,528,201 | 7/1985 | Purves | 426/262 |
| 4,654,221 | 3/1987 | Purves et al. | 426/609 |
| 4,943,389 | 7/1990 | Weete et al. | 252/308 |
| 5,156,876 | 10/1992 | Clapp et al. | 426/811 |

FOREIGN PATENT DOCUMENTS 141842  7/1986  Japan .................................. 426/609

Primary Examiner—Helene Klemanski
Assistant Examiner—C. M. Bonner
Attorney, Agent, or Firm—Victor E. Libert; Frederick A. Spaeth

[57] ABSTRACT

An aerosol-dispensable foodstuffs parting composition for coating cooking surfaces comprising a water-in-oil emulsion containing natural lecithin, refined lecithin or a chemically modified lecithin selected from the group consisting of acylated, preferably acetylated lecithin, hydroxylated lecithin, and acetylated-hydroxylated lecithin, or mixtures thereof; an edible oil; an emulsifying agent; water; and a pressurized, normally gaseous propellant suitable for discharging the composition as an aerosol spray. A procedure for preparing the water-in-oil emulsion comprises mixing together the aforesaid ingredients except the propellant with about 7 to 21% of the total water, to form a concentrate. The remainder of the water and the propellant are added later. The emulsion may also contain one or more of a humectant, a suspending agent, a release agent and a blocking agent.

33 Claims, No Drawings

AEROSOL-DISPENSABLE FOODSTUFFS PARTING COMPOSITION

BACKGROUND OF THE INVENTION

1. Field of the Invention

The present invention relates to an aerosol-dispensable parting composition for use in cooking foodstuffs, more especially to an aerosol parting composition of the type applied to cooking utensils, such as baking and frying pans and the like, in order to prevent or inhibit food from sticking to the utensil during cooking and to facilitate cleaning the utensil.

2. Background and Related Art

The prior art has devoted considerable effort to providing lecithin-containing food parting compositions which do not impart undesirable flavors to, or discolor, foodstuffs and which have a minimum calories content and which may be applied to the cooking surfaces of cooking utensils from a conventional pressurized aerosol dispenser in a smooth (i.e., non-foaming) coating. The coating, which may be used in lieu of oils, grease, butter, etc. to lubricate food-contact surfaces of cooking utensils such as frying and baking pans, facilitates the separation of cooked foodstuffs from cooking surfaces. The use of lecithin, a naturally-occurring substance usually derived from soybeans, is known for this purpose and conventional food release compositions comprise a mixture of lecithin, an edible oil and other known additives.

U.S. Pat. No. 4,479,977, issued Oct. 30, 1984 to Dashiell et al discloses various methods of making acetylated lecithin and its use in food release compositions and in Example 9 recites the use of acetylated lecithin in combination with vegetable oil, ethanol at, e.g., 190 proof, and hydrocarbon propellant for use in aerosols.

SUMMARY OF THE INVENTION

Generally, the present invention provides an aerosol-dispensable parting composition for cooking foodstuffs, the composition utilizing lecithin in combination with an edible oil and an emulsifying agent to provide a water-in-oil emulsion.

Specifically, in accordance with the present invention there is provided an aerosol-dispensable foodstuffs parting composition for coating cooking surfaces. The composition comprises a water-in-oil emulsion comprising lecithin, for example natural lecithin, refined lecithin and/or chemically modified lecithin, the chemically modified lecithin may be selected from the group consisting of one or more of acylated lecithin, e.g., acetylated lecithin, hydroxylated lecithin, and acetylated-hydroxylated lecithin. The composition further comprises an edible oil, an emulsifying agent selected from the group consisting of one or more of monocalcium phosphates, calcium chloride dihydrate, dibasic magnesium phosphate trihydrate, and potassium chloride, plus water and a pressurized, normally gaseous propellant. The propellant may be, for example, a hydrocarbon propellant suitable for discharging the composition as an aerosol spray.

In a preferred embodiment, the lecithin comprises acetylated lecithin.

The parting composition of the present invention may optionally comprise a supplemental emulsifying agent, which may be a polyglycerol ester of fatty acids, for example, 8-octoglycerol-1-oleate or polyglyceryl-4-oleate, in amounts of from about 0.1 to 1.0 percent by weight.

According to one aspect of the invention, the emulsifying agent may comprise from about 0.1 to 8 percent by weight, preferably from about 0.5 to 4 percent by weight of the composition, and may comprise a monocalcium phosphate. The lecithin may comprise fluid lecithin and may be present in amounts of from about 1 to about 20 percent by weight of the composition. Alternatively, the quantity of fluid lecithin may be adjusted to provide from about 0.5 to about 11 percent phospholipids by weight of the composition. In embodiments comprising chemically modified lecithin, the fluid lecithin may comprise at least about 4.5 percent of the composition. Other aspects of the invention provide that sufficient edible oil may be added so that the total edible oil may comprise from about 20 to about 45 percent by weight; the water may comprise from about 13 to about 67 percent by weight and the propellant may comprise from about 10 to about 50 percent by weight of the composition.

Edible oils suitable for the present invention include, e.g., canola, partially hydrogenated winterized canola, soybean, corn, olive, peanut, cottonseed, safflower, partially hydrogenated winterized soybean, sunflower and mineral oils, and mixtures thereof.

The propellant may comprise one or more of butane, isobutane, propane, dimethyl ether, carbon dioxide, nitrous oxide, normally gaseous fluorocarbons such as chlorofluorocarbons, hydrofluorocarbons, and hydrochlorofluorocarbons.

Still other aspects of the present invention provide for inclusion in the parting composition of one or more additives such as a humectant, a suspending agent, an additional release agent, a blocking agent and a flavoring additive. The humectant may be present in an amount of from about 0.1 to about 5 percent by weight of the composition and may comprise a polyhydric alcohol, e.g., glycerine. The suspending agent may be present in an amount of from about 0.1 to 2 percent by weight, and may comprise one or more of silicon dioxides, edible clays, hydrous alumino-silicates and bentonite. Typical silicon oxides may include one or more of colloidal silica, precipitated silica, fumed silica and silicic acid. The additional release agent may be present in amounts of from about 0.1 to 4 percent by weight of the composition and may comprise a phosphated mono- or di-glyceride. The blocking agent may be present in an amount of from about 0.0001 to 0.01 percent by weight of the composition and may comprise calcium carbonate.

In yet another aspect of this invention a process is provided for preparing a parting composition comprising a water-in-oil emulsion by forming a pre-emulsion concentrate by mixing an edible oil with natural lecithin, or a refined lecithin or a chemically modified lecithin as described above, adding a portion of the water used in the formation of the composition as described above, and an emulsifying agent comprising monocalcium phosphate. These ingredients are homogenized to form the pre-emulsion concentrate. The process comprises adding the remainder of the water and a propellant to the preemulsion concentrate thus formed. The water used in forming the pre-emulsion concentrate may comprise from about 7 to 21 percent by weight of the water ultimately added to form the parting composition, the remainder of the water comprising 79 to 93 percent by weight of the water ultimately added. The supplemental emulsifying agent, when used, may be incorporated into either the pre-emulsion concentrate or in the water added thereto in an amount of from about 0.1 to 1.0 percent by weight of the finished composition.

As used herein and in the claims, the term "percent" used with reference to a particular component means the weight of that component in the composition divided by the total weight of the composition, including that of the particular component, with the result multiplied by 100, unless otherwise indicated.

As used herein and in the claims, the term "water-in-oil emulsion" means a heterogeneous colloidal suspension of an internal or discontinuous phase of water droplets in a continuous or "external" oil phase. Conversely, the term "oil-in-water emulsion" means heterogeneous colloidal suspension of a discontinuous oil phase in a continuous water phase.

In addition, the term "emulsifying agent" will refer to the compounds indicated herein, e.g., monocalcium phosphates, etc. It is recognized that lecithin is often considered to act as an emulsifier, but since one aspect of the invention relates to compositions in which the presence of chemically modified lecithin does not result in the formation of an emulsion, the term "emulsifying agent" as used herein and in the claims, shall be understood as not including lecithin unless specifically so indicated.

The term "emulsion waterphase" is used herein to refer to the water extracted from an emulsion by breaking down the emulsion and removing the thus separated aqueous layer.

Other aspects of the present invention are disclosed in the following detailed description of the invention and of certain embodiments thereof.

DETAILED DESCRIPTION OF THE INVENTION AND CERTAIN EMBODIMENTS THEREOF

An aerosol-dispensable food parting or food release composition according to the present invention is useful for preventing cooked foodstuffs from sticking to the cooking utensils, thereby facilitating the removal of the foodstuffs from, and cleaning of, the cooking utensils. The parting composition is packaged in a conventional aerosol spray can with a suitable normally gaseous propellant for discharging an aerosol spray of the parting composition onto the food-contacting surfaces of cooking utensils. The viscosity of the parting composition in the can should be low enough to ensure that the composition is easily dispensed in an aerosol system; high viscosities cause difficulty in dispensing the composition from the container. For example, the user is usually instructed to shake the can before dispensing the food release spray. When the contents of the can are low, a highly viscous formulation will cling to the sides of the can after shaking instead of flowing to the bottom of the can from where it would be dispensed. As a result, the user will often discard the can while there is still an appreciable quantity of parting composition left inside because none was dispensed immediately after shaking. For this reason, some manufacturers are being required to put 17½ ounces or more of food release composition in a can which states the contents are 16½ ounces, because the last ½ ounce or more is not available to the user who follows the directions on the can. In order to dispense the remaining material, the user would have to shake the can and then wait for the food release composition to flow down the sides to the bottom before attempting to dispense the material by spraying.

To improve product delivery from the can, the parting composition of this invention is based on a water-in-oil emulsion which has a low viscosity and is therefore easily dispensed from an aerosol can. In addition, the present invention provides a food release spray with a low oil concentration relative to release products which do not incorporate water. A lower oil concentration is advantageous because it gives a higher rise in baked products and a less viscous material. Also, reducing the amount of oil in the spray coat reduces the amount of oil transferred to food, therefore reducing the transfer of calories to food.

Further, in a food release spray with a minimum of oil, the pan coating formed therefrom is able to meet requirements for Level One insurance status with respect to flammability. "Level One" refers to warehouse storage flammability as established by the National Fire Protection Association ("NFPA") e.g., manufacture and storage of aerosol products (NFPA 30B, 1990 Edition). Level One includes but is not limited to those products having twenty-five percent by weight or less of flammable material in the base product (less propellant) and fifty percent by weight or less of flammable propellant. Flammable material according to certain insurers is that which has a flash point of 750° F. (400° C.) or less. Flammable material according to the above standard of NFPA is that which has a flash point of 500° F. (260° C.) or less. Since vegetable oils have flash points in the 600° F. to 700° F. (315° C. to 371° C.) temperature range, a composition heavy in vegetable oil might not meet the stricter standards. The NFPA might well adopt the stricter standard. Accordingly, the parting composition of this invention, by permitting a lower proportion of oil in the emulsion, should provide a Level One food release composition by the stricter flash point standard whereas food release compositions with higher vegetable oil content might not.

Preferred embodiments of the water-in-oil emulsion-containing compositions of this invention provide emulsions which are stable at ambient temperatures for a period of one year or longer. The emulsion waterphase of these compositions may have a stable pH of between 3.7 and 4.6 for the life of the product, which is favored because bacterial growth is believed to be inhibited in such compositions. When applied as a spray coating, parting compositions according to the present invention are generally opaque, relatively smooth and substantially free of foam. The release characteristics for baked and fried foods of the parting compositions containing the water-in-oil emulsion compositions of this invention are equal to or superior to the more expensive oil-based food release formulations containing natural lecithin. The aerosol-dispensable parting compositions of this invention comprise a water-in-oil emulsion comprising a chemically modified lecithin, an edible oil, one or more emulsifying agents, water and a propellant and, optionally, one or more of a humectant, a suspending agent, a modifying agent, release agents, blocking agents, a flavoring additive and other known additives.

Lecithin is a complex mixture of acetone-insoluble phosphatides (phospholipids) comprised mostly of phosphatidylcholine and lesser amounts of phosphatidylethanolamine and phosphatidylinositol. Lecithin is comprised of the phosphatides and varying amounts of other materials such as triglycerides, diglycerides, monoglycerides, free fatty acids, free sterols and carbohydrates. Commercially available lecithins generally fall into three classes: natural lecithins, refined lecithins and chemically modified lecithins, and are available in fluid form containing the above components in various combinations and proportions dissolved in soybean oil, usually containing from about 50 to 65 percent acetone-insolubles (phospholipids) by weight of lecithin including the oil. In liquid form, the lecithin is available in different viscosities. The lecithin may be unbleached or, in order to lighten its color, it may be bleached, usually by peroxides, and may be filtered or otherwise refined.

Lecithin contains different functional groups that make it reactive in a number of chemical reactions. Chemically modified lecithins suitable for use in the composition of this invention include by way of example and not by way of limitation, acylated, preferably acetylated lecithin, hydroxylated lecithin, and acetylated and hydroxylated lecithin. These lecithins are commercially available and sold, for example, under the trade name Centrophase HR (an acetylated lecithin) and Centrolene A (a hydroxylated lecithin), both available from Central Soya Co., Inc., and Thermolec WFC (an acetylated-hydroxylated lecithin) available from Archer Daniels Midland Company.

The lecithin is present in the emulsion in amounts of from about 1 to about 20 percent by weight, preferably from about 1 to about 12 percent by weight of the composition. The quantity of lecithin may be adjusted to provide a phospholipid content of from about 0.55 to about 11 percent by weight of the composition. In a preferred embodiment, the lecithin comprises acetylated lecithin in an amount of at least about 4.5 percent by weight of the composition.

Any suitable edible oil or mixture of edible oils may be used in formulations according to the present invention. Such oils include, by way of example and not by way of limitation, canola, partially hydrogenated winterized canola, soybean, corn, olive, peanut, cottonseed, safflower, partially hydrogenated winterized soybean, sunflower oils, mineral oils and mixtures thereof. The total edible oil in the emulsion, including oil from the chemically modified lecithin and any oil added thereto is from about 20 to about 45 percent by weight, preferably from about 20 to about 30 percent by weight of the composition. The edible oil may optionally be supplemented with medium chain triglycerides.

The invention comprises an emulsifying agent to facilitate the formation of a stable water-in-oil emulsion for a variety of lecithin types, including chemically modified lecithin, with edible oil and water by the use of previously unknown emulsifying agents. These emulsifying agents include monocalcium phosphates (e.g., anhydrous and monohydrate), calcium chloride dihydrate, magnesium phosphate dibasic trihydrate, and potassium chloride. These materials have been demonstrated herein to allow chemically modified lecithins to form emulsions as substitutes for natural lecithins in formulations where the chemically modified lecithins would not otherwise form emulsions. The emulsifying agent is generally present in amounts of from about 0.1 to about 8 percent by weight of the composition.

Preferably, the pH of the emulsion waterphase is maintained at between 3.7 and 4.6, within which range the long-term stability of the emulsion is enhanced. Also, this is the pH range used to define acid foods which resist bacterial growth that may lead to spoilage or, in the case of toxin-producing anaerobic spore-forming bacteria such as *Clostridum botulinum*, that may cause food poisoning. When the emulsifying agent comprises monocalcium phosphate in amounts of from about 0.5 to about 4 percent by weight of the composition, the desired waterphase pH range of from about 3.7 to about 4.6 is achieved. However, in some instances, e.g., where a low pH is not required for inhibiting bacterial growth, the pH can be raised to as much as 9.5 by the addition of a suitable base such as potassium hydroxide.

The addition of the monocalcium phosphate results in rapid formation of an emulsion that incorporates all formula water indicated below and which has a homogeneous appearance characteristic of a well-formed emulsion. The monocalcium phosphate is commercially available and in some instances is sold coated with, for example, various magnesium, potassium and aluminum phosphates. A preferred monocalcium phosphate is an anhydrous monocalcium phosphate sold under the trade name V-90 by Rhone-Poulenc Basic Chemicals Co. of Shelton, Conn.

Optionally, a supplemental emulsifying agent such as, e.g., 8-octoglycerol-1-oleate (sold under the trade name Santone 8-1-0 by Van den Bergh Foods Company of New York, N.Y.) or polyglyceryl-4-oleate (sold under the trade name Witconol 14F by Witco Chemical Company, of New York, N.Y.) may be added to the composition in addition to the emulsifying agents described above, typically in amounts of from about 0.1 to 1.0 percent. These compounds are polyglycerol esters of fatty acids, but other classes of compounds may serve as supplemental emulsifiers as well. These supplemental emulsifying agents improve the stability of the emulsions of the present invention.

Any suitable propellant acceptable for use in food products may be used in connection with the present invention. For example, by way of illustration and not limitation, conventional hydrocarbon propellants such as commercially available mixtures of butane, isobutane and propane are suitable, as are dimethyl ether, carbon dioxide, nitrous oxide and certain normally gaseous halorocarbons, e.g., chlorofluorocarbons, hydrofluorocarbons and hydrochlorofluorocarbons. However, as environmental concerns grow and related emissions control standards become more stringent, it is advantageous to choose propellants from among those which are exempt from controlling regulations, such as regulations relating to Volatile Organic Compounds and promulgated by the Air Resources Board of the State of California, Stationary Source Division. Such exempt propellants include, by way of example, 1,1-difluoroethane (HFC-152a), trifluoromethane (HFC-23), and tetrafluoroethane (HFC-134a). Other acceptable although non-exempt propellants include, for example, propane, isobutane, n-butane, dichlorodifluoromethane, monochlorodifluoromethane and mixtures thereof. The propellant, which may be present in the formulation as a pressurized gas, a liquified gas and/or a soluble gas dissolved in the liquid component of the composition, is present in an amount at least sufficient to facilitate the delivery to the cooking surface of a cooking utensil of the major portion of the parting composition in a pressurizable container, i.e., from a conventional aerosol spray can. Hydrocarbons and hydrofluorocarbons are the preferred propellants. Typical proportions of propellant may range from about 10 to 30 percent by weight, preferably from about 15 to 25 percent by weight of the composition.

The water content of the water-in-oil emulsion is generally from about 13 to about 67 percent by weight, preferably from about 40 to about 60 percent by weight of the composition.

The composition of this invention may contain one or more of a humectant, a suspending agent, a modifying agent, a release agent, a blocking agent, a flavoring additive and the like.

The humectant may be selected from polyhydric alcohols such as sorbitol, propylene glycol, polypropylene glycol, and glycerine, but glycerine is the preferred humectant. Humectants, as that term is used in the specification and in the claims, are edible compositions which are believed to tend to sequester $H_2O$ molecules and to thereby improve the stability of the emulsion. The humectant may be present in amounts of from about 0.1 to about 5 percent by weight, more typically from about 0.1 to about 2.5 percent by weight of the composition.

Water-in-oil emulsion according to this invention may contain a suspending agent which is believed to prevent the discontinuous phase of the water-in-oil emulsion from settling. The suspending agent should not affect the release properties of the composition to any significant degree, and should not clog the aerosol valve or orifices of the container. Suitable suspending agents include silicon dioxides, such as colloidal silica, precipitated silica or fumed silica and combinations thereof. The suspending agent is typically present in amounts of from about 0.1 to about 2.0, preferably from about 1.0 to about 2.0 percent by weight of the composition.

The water-in-oil emulsion may optionally include a release agent which comprises one or more phosphated derivatives of glycerides of edible fatty materials, e.g., of mono- and di-glycerides of edible fatty materials. Generally, these compounds, unlike some natural or processed lecithins, are free of nitrogen derivatives. The release agent is used in amounts of from about 0.1 to about 4 percent by weight of the composition to enhance the release characteristics of the composition.

A blocking agent may also be optionally included in the water-in-oil emulsion of this invention. As described in the art, the blocking agent may comprise an alkali or alkaline earth metal bicarbonate or carbonate such as sodium bicarbonate or calcium carbonate, magnesium or calcium stearate, and the like and combinations thereof. The blocking agent is used in amounts of from about 0.0001 to about 1.0, preferably from about 0.0001 to about 0.01 percent by weight of the composition.

The parting compositions containing the water-in-oil emulsion of this invention may be prepared by forming a pre-emulsion concentrate as a precursor to the emulsion. Generally, in forming the pre-emulsion concentrate, the total amount of chemically modified lecithin, the oil, the emulsifying agent and other formula constituents beside the propellant, e.g., blocking agent, suspending agent, etc., to be used in the composition are placed in a mixing container along with a portion of the full amount of water called for by the formula for the finished compositions, i.e., the "formula water". However, the supplemental emulsifying agent, if used, may be incorporated into either the pre-emulsion concentrate or the balance of water added later. The portion of the formula water used to prepare the pre-emulsion concentrate may vary depending on the concentration of the lecithin of the finished composition, but is typically from about 4 to about 16 percent by weight of the finished composition, whereas formula water generally comprises from about 13 to 67 percent of the finished composition. Typically, the charge of water used to prepare the pre-emulsion concentrate constitutes from about 7 to about 21 percent of the total water called for in the formulation. In any event, enough of the formula water is used so that the pre-emulsion concentrate is fluid. The ingredients of the pre-emulsion concentrate are blended in a conventional blending apparatus until the ingredients are uniformly mixed and the pre-emulsion concentrate is then homogenized.

One example of a suitable mixing device for laboratory preparation of the emulsion is a hand-operated homogenizer Model 6HH030 manufactured by Chase-Logeman Corporation, Greensboro, N.C. This device is rated to develop a maximum force of 1,000 pounds per square inch. Another suitable piece of homogenization equipment is a two-stage, laboratory homogenizer with a maximum operating pressure of 5,000 pounds per square inch, manufactured by APV Gaulin, Inc. of Wilmington, Mass.

Large-scale production of the emulsion may be accomplished using a homogenizer similar in description to the laboratory model previously described but having a through-put rating of 10 to 50 or greater gallons per minute. APV Gaulin, Inc. also manufactures this equipment.

The pre-emulsion concentrate is mixed continuously until it is placed in the aerosol can. The remainder of the formula water (about 36 to 51 percent by weight) is heated to about 140° F. and is placed in an aerosol can with the pre-emulsion concentrate. The aerosol valve may then be crimped in place to close the container, propellant is added and the container may be mechanically shaken to aid emulsification. Usually, preparation of the composition is carried out at ambient temperatures, generally from about 21° C. to 32° C. (70° F. to 90° F.), preferably at a temperature of from about 24° C. to 27° C. (75° F. to 80° F.).

All references in the TABLES and Examples below, or elsewhere herein, to "%" or "percent", mean percent by weight of the composition as defined above, unless otherwise specifically noted. All such references to various lecithins refer to fluid lecithins, i.e., lecithins dissolved in an edible oil; generally the lecithins used in the examples comprised about 54.5% phospholipids and about 45.5% oil. The indicated quantities for lecithins thus include quantities of the solvent oil. References in the formulae to % oil, e.g., % partially hydrogenated winterized soybean oil, refer to added oil, and do not include the oil associated with the lecithin as discussed above unless specifically so indicated. Thus, it will be understood that in the following examples, the total edible oil in compositions according to the invention is provided in two ways: as oil incorporated into fluid lecithin, and as added oil. It will also be appreciated that the relative percentages of lecithin and added oil may be adjusted to accommmodate fluid lecithins that vary in phospholipid content.

EXAMPLE 1

To determine whether natural, refined or chemically modified (i.e., hydroxylated, acetylated and acetylated-hydroxylated) lecithins satisfactorily form water-in-oil emulsions, seventeen formulations containing natural, refined and chemically modified commercial lecithins as described below in TABLE I were prepared. All the formulations contained 17.9% partially winterized soybean oil, one of the aforesaid lecithins (in fluid form) in amounts to provide 3.3% phospholipids (equivalent to 6% by weight of fluid lecithin having 54.5% phospholipids by weight of the lecithin), 18% hydrocarbon propellant and the remainder of the formulation being water so that the percentage totaled 100 percent. Four formulations comprised natural lecithins, including unbleached, single bleached and filtered single bleached. Seven formulations comprised refined lecithins; one was highly filtered, the others were custom blended. Six formulations comprised chemically modified lecithins, i.e., hydroxylated lecithin (2 formulations) acetylated lecithin (3 formulations, including one highly filtered) and acetylated-hydroxylated lecithin (1 formulation).

The formulations were prepared by first forming a pre-emulsion concentrate by combining in a beaker the oil, lecithin, and water in an amount equal to 8% of the final weight of the composition. The ingredients were mixed to homogeneity using a hand-held mixer sold by Sunbeam Appliance Company under the trade designation MixMaster and the mixture was then homogenized in a hand-operated homogenizer Model 6HH030 manufactured by Chase-Logeman Corporation, Greensboro, N.C., operated at a force of 1,000 pounds per square inch. The pre-emulsion concentrate and the remainder of formula water heated to 140° F. were added to an appropriate aerosol container that was then sealed and filled with 18% propellant and then shaken by hand to promote emulsification.

All of the formulations that comprised natural or refined lecithins formed emulsions; none of the formulations that comprised chemically modified lecithin formed emulsions.

Then, the procedure of Example 1 was exactly repeated except that 1% monocalcium phosphate (sold under the trade designation V-90 by Rhone Poulenc) by weight was added to each formulation in the preparation of the preemulsion concentrate and the amount of water added to the final emulsion was reduced by 1%. Emulsions were formed with all the formulations, including those comprising chemically modified lecithins. These results demonstrate that monocalcium phosphate assists in forming a water-in-oil emulsion with chemically modified lecithins at the stated oil and lecithin concentrations.

EXAMPLE 2

To determine the influence of monocalcium phosphate and various other compounds on emulsification and on water phase pH, fourteen formulations containing acetylated lecithin were prepared by the pre-emulsion concentrate procedure of Example 1. The formulations contained 1% of the compound listed in TABLE IA and were prepared by forming a pre-emulsion concentrate as described in Example 1. The formulations all contained 17.9% of added partially hydrogenated winterized soybean oil, 6% of fluid acetylated lecithin, 57.1% water and 18% hydrocarbon propellant by weight.

The appearance of the emulsion was observed in glass aerosol bottles and characterized in TABLE IA as follows:

I=incomplete emulsification of water with free water visible.

C=emulsion completely formed with no free water visible.

G=granular appearance of the emulsion.

Y=creamy appearance of the emulsion.

TABLE IA

| Compound | Formulation Number | Emulsion formed, appearance |
|---|---|---|
| Monocalcium phosphate, monohydrate | 1 | C |
| | 2 | I |
| | 3 | C, Y |
| | 4 | C, Y |
| Monocalcium phosphate, anhydrous[1] | 5 | C, Y |
| | 6 | C, Y |
| Calcium phosphate dibasic | 7 | I |
| | 8 | I |
| Calcium phosphate tribasic | 9 | I |
| | 10 | I |
| Calcium chloride | 11 | C, Y |
| Calcium carbonate | 12 | I |
| Magnesium phosphate, dibasic, trihydrate | 13 | C, Y |
| | 14 | I |
| Potassium chloride | 15 | C, G |
| Potassium phosphate, monobasic | 16 | I |
| Trisodium phosphate, dodecahydrate | 17 | I |
| Disodium phosphate, duohydrate | 18 | I |
| Sodium hexametaphosphate | 19 | I |

[1]Formulations 5 and 6 were prepared using anhydrous monocalcium phosphate obtained from Rhône Poulenc under the designation V-90 (Food Grade) and Monsanto under the designation Pyran (Food Grade), respectively.

The data of TABLE IA show that two forms of monocalcium phosphate, calcium chloride dihydrate, dibasic magnesium phosphate trihydrate, and potassium chloride all function as emulsifying agents for chemically modified lecithins.

The emulsion waterphase of each of the formulations of TABLE IA was extracted from its emulsion and its pH was measured and recorded. In addition, for comparison, the indicated compounds were added in the amounts used in the respective formulae to corresponding formula quantities of water, and the pH of the resulting (sometimes saturated) solutions were measured. The results are set forth in TABLE IB.

TABLE IB

| | | pH | |
|---|---|---|---|
| Compound | Formulation Number | Water Solution | Separated emulsion waterphase |
| Monocalcium phosphate, monohydrate | 1 | 3.4 | 4.1 |
| | 2 | 2.9 | 3.9 |
| | 3 | 3.3 | 4.6 |
| | 4 | 3.9 | 4.5 |
| Monocalcium phosphate, anhydrous[1] | 5 | 4.0 | 4.5 |
| | 6 | 3.9 | 4.4 |
| Calcium phosphate dibasic | 7 | 7.1 | 7.3 |
| | 8 | 7.1 | 7.3 |
| Calcium phosphate tribasic | 9 | 5.8 | 7.2 |
| | 10 | — | — |
| Calcium chloride dihydrate | 11 | 6.2 | 5.5 |
| Calcium carbonate | 12 | 8.7 | 7.3 |
| Magnesium phosphate, dibasic, trihydrate | 13 | 7.6 | 7.1 |
| | 14 | — | — |
| Potassium chloride | 15 | 6.8 | 6.6 |
| Potassium phosphate, monobasic | 16 | 4.5 | 4.7 |
| Trisodium phosphate, dodecahydrate | 17 | 11.8 | 8.5 |
| Disodium phosphate, duohydrate | 18 | 8.7 | 7.7 |
| Sodium hexameta- | 19 | 6.9 | 6.7 |

TABLE IB-continued

| Compound | Formulation Number | pH Water Solution | Separated emulsion waterphase |
|---|---|---|---|
| phosphate | | | |

[1]Formulations 5 and 6 were prepared using anhydrous monocalcium phosphate obtained from Rhône Poulenc under the designation V-90 (Food Grade) and Monsanto under the designation Pyran (Food Grade), respectively.

The data of TABLE IA show that formulations comprising monocalcium phosphates in anhydrous or in some monohydric forms (numbers 1, 3–6), calcium chloride (number 11), dibasic magnesium phosphate trihydrate (number 13), and potassium chloride (number 15) were able to form emulsions successfully with chemically modified lecithin. In addition, as indicated by TABLE IB, Formulations 1–6, comprising monocalcium phosphates, were able to maintain emulsion waterphase pH values in the desired range of 3.7 to 4.6, discussed above. The fact that the pH of simple solutions of corresponding quantities of the monocalcium phosphates in formula quantities of water are lower than the pH of the waterphase from the emulsions suggests that only a portion of the monocalcium phosphate in the emulsion is soluble or reacted in the waterphase, and that an insoluble portion remains suspended in the continuous or emulsion oil phase and serves as a reservoir for additional soluble material which may be able to migrate into the aqueous phase and act as a buffer against a rise in pH.

EXAMPLE 3

A series of parting compositions were prepared to evaluate the long term stability and ease of formation of the emulsions they form. The formulations contained 17.9% partially hydrogenated winterized soybean oil (but Formulation 2 contained partially hydrogenated canola oil), either the natural or acetylated lecithin to provide a phospholipid content of 3.8%; 1% of monocalcium phosphate (anhydrous monocalcium phosphate, V-90, manufactured by Rhone Poulenc in Formulations 1, 2 and 3 and monohydric monocalcium phosphate, 12XX, manufactured by Rhone Poulenc in Formulation 4), 0.15% of phosphated mono- and diglycerides; 0.0001% of calcium carbonate, 18% hydrocarbon propellant and water, the percentage of which was adjusted so that formulas total 100 percent. Formulations 1 and 2 include 2.5% glycerine.

The formulations were prepared by first forming a pre-emulsion concentrate as described in Example 1 by combining as appropriate for each formulation the oil, lecithin, monocalcium phosphate, glycerine (where used) and 8% of the final composition weight as water. The ingredients were mixed to assure dispersion of water and then homogenized as described in Example 1. The pre-emulsion concentrate and the remainder of formula water (heated to 140° F.) were added to an appropriate aerosol container that was then sealed and filled with 18% propellant.

TABLE II summarizes the characteristics of the resulting formulations observed at the indicated intervals following their preparation. The emulsion viscosity was observed at room temperature one day after its formation and then at 130° F., 30 days after its formation. The color of the emulsion was observed after storage for 30 days at 130° F. and is set forth in TABLE II. Taste of the emulsion after storage for 3 months at 100° F. was also evaluated. The results are also set forth in TABLE II.

TABLE II

| | Type of Lecithin | | |
|---|---|---|---|
| | Chemically Modified | | Natural |
| | Glycerine | No Glycerine | No Glycerine |
| Formulation | 1 | 2 | 3 |
| Emulsion formation. Time/hrs. Observation[1] | .05/4 C, G/C, Y | 4/24/48 I/C, G/C, Y | 4/24/48 I/I/C, G |
| Emulsion viscosity. 1 day ambient 3 days 130° F. | water-like water-like | water-like water-like | water-like thick |
| Emulsion color. 30 days 130° F. | pale yellow | pale yellow | brownish yellow |
| Emulsion taste. 3 mo. 100° F.) | slightly tart | slightly tart | metallic, oxidized |

[1]See Example 3 for characterization of the appearance of the emulsion.

The data in this TABLE II demonstrates that Formulations 1 and 2 which contain acetylated lecithin and monocalcium phosphate, emulsify more quickly than does Formulation 3 which contains natural lecithin and monocalcium phosphate. The inclusion of glycerine in Formulation 1 hastens emulsification compared to the rate of emulsification observed for the formulation containing the acetylated lecithin without glycerine (Formulation 2).

The data in TABLE II also demonstrate that Formulation 3 containing the natural lecithin and monocalcium phosphate, thickened after storage for 30 days at 130° F., and were thicker than formulations containing acetylated lecithin and monocalcium phosphate stored under the same conditions.

Further, the data in TABLE II demonstrate that Formulation 3 containing natural lecithin and monocalcium phosphate developed a brownish color after storage for 30 days at 130° F. This darkening is associated with heat sensitivity of natural lecithins. This brownish color was not observed in Formulations 1 and 2 (containing acetylated lecithin and monocalcium phosphate) and the original color was maintained in these formulations indicating resistance to changes induced by elevated temperatures.

Additionally, a sprayed emulsion formulated with natural lecithin and monocalcium phosphate (Formulation 3) had a metallic taste after 3 months storage at 100° F. indicating oxidation and developing rancidity in the product. In contrast, Formulations 1 and 2, containing acetylated lecithin and monocalcium phosphate, tasted characteristically of an acid emulsion under the same storage conditions and displayed no evidence of rancidity.

EXAMPLE 4

Release tests were conducted on the formulations prepared and contained as described in Example 3, using a 9¾ inch by 7½ inch uncoated aluminum pan with 12 cavities measuring 1⅞ inches (4.76 cm) in diameter at the top, 1¼ inches (3.18 cm) in diameter at the bottom and ¾ inch (1.90 cm) in depth. The various formulations were applied to the pan by spraying each pan cavity in a circular fashion to favor the deposition of a uniform coating of 5 to 7 gm of spray on the entire pan surface. Each parting composition formulation was tested twice, once with Jiffy ® Blueberry Muffin Mix (7.0 ounce package) and once with Jiffy ® White Cake Mix, (9 ounce package), both obtained from Chelsea Milling Company, Chelsea, Mich. The muffin and cake batters were prepared according to the instructions on the box with the exception that the blueberry muffin mix was altered by addition of ½ teaspoon powdered buttermilk and by deleting all milk while adding ¼ cup water. The cake mix was altered by the addition of one large egg instead of one egg white, as indicated in the directions. In each test, 10.5 to 11.5 gm of batter was spooned into each cavity of the pan.

Once the pan was filled with batter, it was placed in an oven preheated to 350° F. The muffins were baked at this temperature for fifteen minutes, the cupcakes for twenty minutes. In each case, after the baking period, the pans were removed and allowed to cool for five minutes at room temperature. The pans were then inverted to an upside-down position to see if any of the muffins or cupcakes fell out, and the results were noted. While inverted, the pan was shaken once to see if additional cupcakes or muffins fell out, and the results were noted. The shakes were repeated one at a time until the upsidedown pan was subjected to ten shakes and the number of cakes or muffins that fell out in each shake was recorded. At the end of ten shakes it was noted how many cupcakes or muffins, if any, remained in the pan.

The observations made during the shake procedure were quantified by assessing "points" according to the total number of shakes required to dislodge the cakes or muffins as follows. For each cake or muffin which fell out of its cavity upon the initial inversion of the pan without shaking, 0 points was charged; thereafter, each cavity accrued one point for each shake required to dislodge the cake or muffin baked in it. For each cake or muffin which remained in the pan after ten shakes, fifteen points were assessed to that pan cavity. The release value assigned each formulation is equal to the sum of points charged to the cavities in the pan divided by the number of cavities. Consequently, the lower the release number is, the more effective is the parting composition. The release characteristics were obtained by calculating an average release value obtained for blueberry muffins and cupcakes. The results of the two release tests were used to calculate average release values.

The results are shown in TABLE III.

TABLE III

| | Type of Lecithin | | |
| --- | --- | --- | --- |
| | Chemically Modified | | Natural |
| | Glycerine | No Glycerine | No Glycerine |
| Formulation | 1 | 2 | 3 |
| | Baking release test values (average) | | |
| Initial | 0.12 | 0.08 | 0.16 |
| 1 mo. 130° F. | — | 0.12 | 10.62 |
| 3 mo. 100° F. | — | 0.62 | 9.30 |
| 12 mo. ambient | 0.29 | 0.42 | Emulsion broken |
| 12 mo. 100° F. | — | 12.66 | Emulsion broken |

The data in TABLE III show that baking release tests conducted with formulations containing acetylated and natural lecithins yielded similar results on initial testing when the formulations were first prepared. The same tests were conducted on formulations stored at 100° F. for 3 and 12 months, or at ambient temperatures (about 75° F.) for 12 months. The data demonstrate the superior stability and baking-release characteristics for formulations containing acetylated lecithin as compared to formulations prepared with identical amounts of phospholipids from natural lecithin that had not been acetylated. Emulsions containing natural lecithin and stored at either ambient temperatures or 100° F. did not perform as release agents and were no longer emulsions when tested. A fourth formulation, identical to Formulation 1 but comprising lightly hydrogenated canola oil instead of partially hydrogenated soybean oil was also prepared, was stored for six months at 100° F., and obtained a release value of 2.00.

The most significant results from release testing are data presented for Formulations 1 and 2 stored under ambient conditions for 12 months. These formulations contained acetylated lecithin and demonstrated only slight change in release test results from identical formulations tested 12 months earlier when initially prepared.

EXAMPLE 5

A series of 11 formulations were prepared to evaluate the influence of monocalcium phosphate concentration on emulsification, waterphase pH values and average bakingrelease values of bottled aerosol formulations containing acetylated lecithin. All the formulations contained 6% acetylated lecithin except Formulation 10 which had 8% acetylated lecithin; monocalcium phosphate in the amounts indicated in TABLE IV; 17.9% partially hydrogenated winterized soybean oil; 18% hydrocarbon propellant and water, the percentage of which was adjusted so that the formulas totaled 100%. The formulations were prepared and added to containers by the procedure as described in Example 1. The waterphase pH was measured, the average release value was determined according to the procedure described in Example 4 and the emulsion appearance was observed and recorded.

The results are shown in TABLE IV.

TABLE IV

| Formulation No. | (a) | (b) | (c) | (d) | (e) |
| --- | --- | --- | --- | --- | --- |
| 1 | 0 | 6 | 6.8 | 2.8 | I |
| 2 | 0.1 | 6 | 6.2 | 1.1 | C |
| 3 | 0.5 | 6 | 4.1 | 0.6 | C |
| 4 | 1 | 6 | 4.0 | 0.1 | C |
| 5 | 1 | 6 | 3.9 | 0.1 | C |
| 6 | 2 | 6 | 4.0 | 0 | C |
| 7 | 4 | 6 | 3.1 | 0.3 | C |
| 8 | 4 | 6 | 3.0 | 0.1 | C |
| 9 | 6 | 6 | 2.9 | 0.9 | C, P |
| 10 | 6 | 8 | 2.9 | 0.2 | C |
| 11 | 8 | 6 | 2.7 | 0 | C, P |

(a) Monocalcium phosphate, %
(b) Acetylated lecithin, %
(c) Waterphase pH
(d) Average release value
(e) Emulsion appearance
I: Incomplete emulsification; free water visible
C: Emulsion completely formed; no free water visible
P: Monocalcium phosphate powder at bottom of bottle The data in TABLE IV show that at least 0.1% monocalcium phosphate is required to enable the formation of an emulsion and that the waterphase pH generally varies with the amount of monocalcium phosphate in the formula, subject to a plateau at concentrations from 0.5 through 2.0%. From a pH-control perspective, an amount of monocalcium phosphate of from about 0.5% to about 4% is desirable to produce an acid food pH as discussed above. This applies to pH evaluation carried out within a few days after the formulations were prepared. The benefit of buffer capacity to prevent pH increase during long-term product storage discussed above in Example 2 would be more likely to occur at levels greater than 0.1 percent. The upper preferred amount of monocalcium phosphate for formulations containing 6% acetylated lecithin is below 4%, above which an undesirably low pH (3.1) results.

A comparison of the results from Formulations 8, 9 and 11 shows that the maximum concentration for monocalcium phosphate in a composition comprising 6% acetylated lecithin is in the range of about 4 percent to about 6 percent. In Formulation 8, all of the 4% monocalcium phosphate was incorporated into the emulsion. Formulation 9, with 6% monocalcium phosphate, had free water which later became incorporated into the emulsion, but also had a slight granular residue of undissolved monocalcium phosphate. Formulation 11, with a monocalcium phosphate concentration of 8%, yielded an emulsion that incorporated the formula water but could not incorporate all the phosphate (Formulation 11). The solid particles of monocalcium phosphate that remained on the bottom of the bottle are considered to be undesirable because they can interfere with aerosol dispersal of the composition by plugging the spray valve mechanism. Formulation 10, however, comprised 8% lecithin and was able to form an emulsion and incorporate 6% monocalcium phosphate. Therefore, the maximum amount of monocalcium phosphate successfully included in formulations may increase with the proportion of chemically modified lecithin in the formula.

Example 6

A series of eight formulations were prepared to evaluate the influence of phosphated mono- and di-glycerides on emulsification of bottled aerosol formulations containing acetylated lecithin and monocalcium phosphate. All the formulations contained phosphated mono- and di-glycerides (sold under the tradename Emphos D70-30C by Witco Corp.) and acetylated lecithin in the amounts shown in TABLE V, 17.9% partially hydrogenated winterized soybean oil, 1% anhydrous monocalcium phosphate, 0.0001% calcium carbonate, 18% hydrocarbon propellant and water, the percentage of which was adjusted so that the formulations totaled 100%. The formulations were prepared and added to containers by the procedure as described in Example 1. The average release value was determined by the procedure described in Example 4, and the emulsion appearance was observed immediately after gassing and shaking and then 24 hours after shaking.

The results are presented in TABLE V.

TABLE V

| Form. No. | (a) | (b) | (c) | Emulsion appearance Immediately after gassing/shaking | 24 hrs. after shaking |
|---|---|---|---|---|---|
| 1 | 0 | 6 | 0.08 | no foam, smooth | smooth, no free water |
| 2 | 0.5 | 5.5 | 0.08 | foamed, thin | no free water |
| 3 | 0.5 | 6 | 0 | foamed, thin | free water, unemulsified solids |
| 4 | 1 | 5 | 0 | foamed, emulsified slowly | free water |
| 5 | 1 | 6 | 0 | foamed, emulsified slowly | free water |
| 6 | 2 | 4 | 0 | slight foam | free water[1] |
| 7 | 2 | 6 | 0 | no foam, smooth | free water[1] |
| 8 | 4 | 6 | 0.12 | no foam, smooth | free water[1] |

(a) Phosphated mono- and di-glycerides, %
(b) Acetylated lecithin, %
(c) Average release value
[1] With additional periodic shaking, free water was incorporated into formulations within 7 days.

The data in TABLE V demonstrate that up to about 1% diglycerides can be incorporated into the parting composition without affecting the formation of the emulsion. Complete emulsification of all formulation water following preparation took longer than 24 hours with periodic shaking. When 1% or more of the glycerides were included in the formulations, additional time for emulsifying and shaking was needed, indicating that these formulations present processing difficulties. Concentrations smaller than 1% glycerides in combination with appropriate amounts of acetylated lecithin may improve emulsion stability. All levels of phosphated mono- and di-glycerides tested in combination with various amounts of acetylated lecithin produced release test values comparable to results obtained with acetylated lecithin without glycerides (Formulation 1).

EXAMPLE 7

A series of 12 formulations were prepared to evaluate the emulsion characteristics of aerosol formulations containing various proportions of either natural lecithin or acetylated lecithin, with and without monocalcium phosphate, varying proportions of added partially hydrogenated winterized soybean oil, 18% hydrocarbon propellant and water, the percentage of which was adjusted so that the formulation totaled 100%. The formulations were prepared and added to containers by the procedure as described in Example 1. The type and appearance of the resulting emulsion or separation of the mixture if an emulsion did not form, was observed and recorded. The results are set forth in TABLE VI.

TABLE VI

| Form. No. | (a) | (b) | (c) | Emulsion Type[1] | Appearance |
|---|---|---|---|---|---|
| Natural Lecithin | | | | | |
| 1 | 4.5 | 0 | 17.8 | w/o | thick |
| 2 | 9 | 0 | 20.0 | w/o | thick |
| 3 | 15 | 0 | 21.7 | w/o | semisolid |
| Acetylated Lecithin | | | | | |
| 4 | 4.5 | 0 | 17.9 | o/w | separated |
| 5 | 4.5 | 0 | 18.6 | o/w | separated |
| 6 | 9 | 0 | 17.9 | o/w | separated |
| 7 | 12 | 0 | 15.6 | o/w | thin |
| 8 | 15 | 0 | 13.8 | o/w | thick |
| 9 | 15 | 0 | 17.9 | w/o | thick |
| 10 | 4.5 | 1 | 17.9 | w/o | thin |
| 11 | 9 | 1 | 17.9 | w/o | thin |
| 12 | 15 | 1 | 17.9 | w/o | thin |

(a) Lecithin, %
(b) Monocalcium phosphate, %
(c) Added partially hydrogenated winterized soybean oil, %
[1] o/w, w/o represent oil-in-water, and water-in-oil emulsions, respectively.

Formulations 1-3 illustrate that the amounts of natural lecithin and added oil can be varied in the formulation and water-in-oil emulsions can still be attained in the absence of an emulsifying agent, and that the viscosity of such formulations increases with lecithin content.

Formulations 4-9, which comprise acetylated lecithin but no emulsifying agent, illustrate that even at low lecithin levels, e.g., 4.5%, acetylated lecithin does not form thin stable water-in-oil emulsions without an emulsifying agent. Formulations 7 and 8 formed oil-in-water emulsions, not water-in-oil emulsions. Water-in-oil emulsions are preferred because they adhere more strongly to cooking utensils than oil-in-water emulsions. Formulation 9 formed a water-in-oil emulsion that was too thick to perform satisfactorily as an aerosol spray. However, the results for Formulations 10-12 demonstrate the ability of monocalcium phosphate to enable acetylated lecithin to form thin, water-in-oil emulsions over a wide range of lecithin concentrations in the presence of a relatively small quantity of added oil (see Formulations 10, 11 and 12). This affords a more efficient spraydown of aerosol product leaving less material in the container.

EXAMPLE 8

A series of formulations was prepared containing varying amounts of acetylated lecithin and 1% monocalcium phosphate as an emulsifying agent, 17.9% partially hydrogenated winterized soybean oil, 2% glycerine, 18% hydrocarbon propellant and water, the percentage of which was adjusted so that the formulations totaled 100%. The quantity of acetylated lecithin was varied between 2.5% and 20%. The ingredients were mixed together using the preemulsion concentrate procedure described in Example 1. The results indicate that at least 4.5% acetylated lecithin was required to form a water-in-oil emulsion in the presence of an emulsifying agent and of an oil content of 17.9%. Lesser amounts (3% and 2.5% acetylated lecithin by weight) resulted in unstable oil-in-water emulsions.

EXAMPLE 9

A series of formulations was prepared to determine the minimum amount of edible oil needed for emulsification in the absence of monocalcium phosphate and to evaluate the appearance of water-in-oil emulsions and spray coats of the aerosol formulations so produced. The formulations contained various amounts of acetylated lecithin as shown in TABLE VII. For each level of lecithin, two formulations having different amounts of partially hydrogenated winterized soybean oil were prepared. The formulations all contained 18% hydrocarbon propellant and water, the percentage of which was adjusted so that the formulations totaled 100%. The formulations were prepared and added to containers by the procedure as described in Example 1.

TABLE VII shows in column (c) the approximate threshold percentages of added oil required to form a water-in-oil emulsion at the lecithin level indicated in column (a). The emulsion waterphase pH of each of these formulations was measured and is shown in TABLE VII. Also, the appearance of the emulsion and spray coat for each of these formulations was observed and is set forth in TABLE VII.

The formulations having the oil content indicated in column (b) did not form emulsions. Therefore, a comparison of columns (b) and (c) indicates the minimum quantity of oil required to form an emulsion comprising the quantities of lecithin indicated in column (a) in the absence of an emulsifying agent.

TABLE VII

| Form. No. | (a) | (b) | (c) | (d) | Appearance of Emulsion | Appearance of Spray Coat |
|---|---|---|---|---|---|---|
| 1 | 1 | (39.5) | 44.5 | 8.0 | thin | oil-like |
| 2 | 2 | (39) | 44 | 7.7 | syrupy | oil-like |
| 3 | 4.5 | (25) | 28 | 7.6 | syrupy | emulsified weakly |
| 4 | 9 | (19.5) | 21 | 7.0 | thick | emulsified well |
| 5 | 15 | (13.9) | 16.2 | 6.8 | thick | emulsified well |
| 6 | 20 | (8.3) | 11 | —[1] | thick | emulsified excellently |

(a) Acetylated lecithin, %
(b) Proportion of added oil failing to produce an emulsion
(c) Proportion of added oil yielding a water-in-oil emulsion
(d) Emulsion waterphase pH
[1]Accuracy of waterphase pH value at this lecithin concentration was questionable since the emulsion was not broken by a freeze/thaw cycling.

The data in TABLE VII indicate, for example, the minimum proportion of added oil to yield an emulsion "spontaneously" when 1% acetylated lecithin is present in the formulation is between about 40 and 45% (Formulation 1).

Emulsion waterphase pH values demonstrate the inability of acetylated lecithin to control waterphase pH values to below 4.6 over the range of lecithin values (1 to about 20%) generally used in emulsion release sprays.

As lecithin concentration increases, the amount of total oil needed for emulsification decreases. Increasing lecithin concentration improves emulsification and is reported in descriptive evaluations of the emulsions and spray coats.

EXAMPLE 10

A series of formulations was prepared without emulsifying agents to evaluate the appearance of spray coats from bottled aerosol formulations and to determine the influence of the method of preparation on the formation of the emulsion. The methods used were the pre-emulsion concentrate method as described in Example 1 and two others: a slow-blend method and a method involving the homogenization of the complete formulation.

Formulations having 2, 9 and 15% lecithin (54.5% phospholipids) were selected with two different levels of added partially hydrogenated winterized soybean oil, the emulsion-yielding level indicated in TABLE VII of Example 9 and a level representing 5% excess over the first level. All the formulations contained 18% propellant and water adjusted to complete the formula. The formulations were then prepared by the three methods.

The pre-emulsion method of preparing an emulsion is described in Example 1. In the slow-blend method, the ingredients were slow-blended in a MixMaster hand mixer, Model 03181 from Sunbeam Appliance Company operating at a speed setting of 5. In the homogenized method, the formulations were homogenized in a hand-operated homogenizer Model 6HH030 manufactured by Chase-Logeman Corporation, Greensboro, N.C., operated at a force of 1,000 pounds per square inch.

The results are shown in TABLES VIIIA, VIIIB and VIIIC.

TABLE VIIIA

| Preparation Method | 2% Acetylated Lecithin Added Oil (44%) | 2% Acetylated Lecithin Added Oil (49%) |
|---|---|---|
| Pre-emulsion Concentrate | w/o L, S | w/o L, S |

TABLE VIIIA-continued

| | 2% Acetylated Lecithin | |
|---|---|---|
| Preparation Method | Added Oil (44%) | Added Oil (49%) |
| No pre-emulsion | | |
| Slow-Blend | o/w A, F | o/w A, F |
| | Separated | Separated |
| Homogenized | o/w A, F | o/w A, F |

TABLE VIIIB

| | 9% Acetylated Lecithin | |
|---|---|---|
| Preparation Method | Added Oil (21%) | Added Oil (26%) |
| Pre-emulsion Concentrate | w/o L, S | w/o L, S |
| No pre-emulsion | | |
| Slow-Blend | w/o L, S | w/o S |
| | Separated | Separated |
| Homogenized | o/w A, F | o/w A, F |

TABLE VIIIC

| | 15% Acetylated Lecithin | |
|---|---|---|
| Preparation Method | Added Oil (16.2%) | Added Oil (21.2%) |
| Pre-emulsion Concentrate | w/o S | w/o S |
| No pre-emulsion | | |
| Slow-Blend | o/w A, F | o/w A, F |
| | Separated | Not Separated |
| Homogenized | o/w A, F | o/w A, F |

Spray coat evaluations:
L = oily;
A = watery;
F = foamy;
S = smooth.
w/o = water-in-oil emulsion
o/w = oil-in-water emulsion The data in the preceding TABLES VIII A, B and C show that in each case, only the pre-emulsion concentrate technique produced a stable water-in-oil emulsion which was smooth. The homogenization technique produced oil-in-water emulsions in each case and the slow-blend technique did not provide stable emulsions. Techniques involving only blending of all components, or blending of all ingredients followed by homogenization are unable to form emulsions with minimum amounts of edible oil.

While the invention has been described in detail with respect to specific preferred embodiments thereof it will be appreciated that variations thereto may be made which nonetheless lie within the scope of the invention and the appended claims.

What is claimed is:

1. An aerosol-dispensable foodstuffs parting composition for coating cooking surfaces comprising a water-in-oil emulsion comprising lecithin, an edible oil, an emulsifying agent selected from the group consisting of one or more of monocalcium phosphate, calcium chloride dihydrate, dibasic magnesium phosphate trihydrate and potassium chloride, water, and a pressurized, normally gaseous propellant suitable for discharging the composition as an aerosol spray.

2. The parting composition of claim 1 wherein the lecithin comprises chemically modified lecithin selected from the group consisting of one or more of acylated lecithins, hydroxylated lecithins and acetylated-hydroxylated lecithins.

3. The parting composition of claim 2 wherein the chemically modified lecithin comprises acetylated lecithin and wherein the emulsifying agent is present in amounts of from about 0.1 to about 8.0 percent by weight of the composition.

4. The parting composition of claim 2 or claim 3 wherein the emulsifying agent comprises a monocalcium phosphate.

5. The parting composition of claim 2 or claim 3 wherein the lecithin comprises fluid lecithin and is present in amounts of from about 1 to about 20 percent by weight of the composition and emulsifying agent is present in amounts of from about 0.1 to about 8.0 percent by weight of the composition.

6. The parting composition of claim 2 or claim 3 wherein the lecithin comprises fluid lecithin having a phospholipid content of from about 0.5 to about 11 percent by weight of the composition and emulsifying agent is present in amounts of from about 0.1 to about 8.0 percent by weight of the composition.

7. The parting composition of claim 2 or claim 3 comprising fluid chemically modified lecithin in an amount of at least about 4.5 percent by weight of the composition.

8. The parting composition of claim 2 or claim 3 wherein the edible oil comprises one or more oils selected from the group consisting of canola, partially hydrogenated winterized canola, soybean, corn, olive, peanut, cottonseed, safflower, partially hydrogenated winterized soybean and sunflower oils.

9. The parting composition of claim 2 or claim 3 wherein the total edible oil is present in an amount of from about 20 to about 45 percent by weight of the composition.

10. The parting composition of claim 4 wherein the emulsifying agent is present in amounts of from about 0.5 to 4 percent by weight of the composition.

11. The parting composition of claim 1, claim 2 or claim 3 wherein the water is present in amounts of from about 13 to about 67 percent by weight of the composition.

12. The parting composition of claim 11 wherein the propellant comprises one or more propellants selected from the group consisting of butane, isobutane, propane, chlorofluorocarbons, hydrochlorofluorocarbons, fluorocarbons, hydrofluorocarbons, and dimethyl ether.

13. The parting composition of claim 12 wherein the propellant is present in amounts of from about 10 to about 50 percent by weight of the composition.

14. The parting composition of claim 1, claim 2 or claim 3 further comprising one or more of a humectant, a suspending agent, a release agent, and a blocking agent.

15. The parting composition of claim 14 wherein the humectant comprises a polyhydric alcohol.

16. The parting composition of claim 15 wherein the humectant comprises glycerine in amounts of from about 0.1 to about 2.5 percent by weight of the composition.

17. The parting composition of claim 14 wherein the suspending agent is present in an amount of from about 0.1 to about 2.0 percent by weight of the composition and comprises one or more agents selected from the group consisting of silicon dioxide, and edible clays.

18. The parting composition of claim 17 wherein the silicon dioxide comprise one or more of oxides selected from the group consisting of colloidal silica, precipitated silica, and fumed silica.

19. The parting composition of claim 14 wherein the release agent is present in an amount of from about 0.1 to 4.0 percent by weight of the composition.

20. The parting composition of claim 14 wherein the release agent comprises a phosphated mono- or di-glyceride.

21. The parting composition of claim 14 wherein the blocking agent comprises one or more blocking agents selected from the group consisting of an alkali metal or alkaline earth metal carbonate or bicarbonate and an alkaline earth metal stearate.

22. The parting composition of claim 21 wherein the blocking agent comprises calcium carbonate present in amounts of from about 0.0001 to about 0.10 percent by weight of the composition.

23. The parting composition of claim 4 further comprising a supplemental emulsifying agent comprising at least one polyglycerol ester of a fatty acid in an amount of from about 0.1 to about 1.0 percent by weight.

24. The parting composition of claim 23 wherein the supplemental emulsifying agent comprises one or both of 8-octoglycerol-1-oleate and polyglyceryl-4-oleate.

25. An aerosol-dispensable foodstuffs parting composition for coating cooking surfaces comprising a water-in-oil emulsion comprising from about 4.5 to 20 percent by weight of a fluid chemically modified lecithin, sufficient added edible oil to provide total oil content of from about 20 to 45 percent by weight of edible oil, an emulsifying agent comprising from about 0.1 to 8 percent by weight monocalcium phosphate, water and a pressurized, normally gaseous propellant suitable for discharging the composition as an aerosol spray.

26. The parting composition of claim 25 wherein the fluid chemically modified lecithin comprises acylated lecithin.

27. The parting composition of claim 26 wherein the lecithin comprises acetylated lecithin.

28. A process for preparing a parting composition comprising a water-in-oil emulsion comprising a total of from about 13% to 67% water by weight of the composition, the process comprising forming a pre-emulsion concentrate by mixing an edible oil with one or more chemically modified lecithins selected from the group consisting of acylated lecithin, hydroxylated lecithin, and acetylated-hydroxylated lecithin, adding an emulsifying agent comprising a monocalcium phosphate with from about 7 to 21% of the total water, homogenizing said ingredients together to form a pre-emulsion concentrate, and then adding the remainder of the total water.

29. The process of claim 28 further comprising heating the remainder of the total water before adding it to the pre-emulsion concentrate.

30. The process of claim 28 or claim 29 further comprising shaking the ingredients after adding the remainder of the water and the propellant to aid emulsification.

31. The process of claim 30 further comprising adding a base to adjust the pH of the waterphase of the emulsion to between about 4.6 to 9.5.

32. The process of claim 28 or claim 29 wherein one of the pre-emulsion concentrate or the remainder of the total water further comprises a supplement emulsifier comprising a polyglycerol ester of fatty acids in an amount of from about 0.1 to 1.0 percent by weight.

33. The parting composition of claim 17 wherein the suspending agent is silicic acid.

* * * * *

UNITED STATES PATENT AND TRADEMARK OFFICE
CERTIFICATE OF CORRECTION

PATENT NO. : 5,296,021
DATED : March 22, 1994
INVENTOR(S) : Clarence P. Clapp et al It is certified that error appears in the above-indentified patent and that said Letters Patent is hereby corrected as shown below:

In column 1, line 18, replace "calories" with --calorie--.
In column 8, line 58, replace "accommmodate" with --accommodate--.
In column 11, line 20, replace "int he" with --in the--.
In TABLE II of column 12, line 15, replace "3 days 130°F." with --30 days 130°F.--.
In column 14, line 23, replace "bakingrelease" with --baking release--.
In column 18, line 22, between "formulation" and "is" insert therefor --and--.

In The Claims

Column 20, line 63, replace "comprise" with --comprises--.
Column 22, line 27, replace "supplement" with --supplemental--.

Signed and Sealed this

Twelfth Day of December, 1995

Attest:

BRUCE LEHMAN

Attesting Officer

Commissioner of Patents and Trademarks